US008435001B2

United States Patent
Montgomery et al.

(10) Patent No.: US 8,435,001 B2
(45) Date of Patent: May 7, 2013

(54) PLASMA INDUCED FLOW CONTROL OF BOUNDARY LAYER AT AIRFOIL ENDWALL

(75) Inventors: Matthew D. Montgomery, Jupiter, FL (US); Ching-Pang Lee, Cincinnati, OH (US); Chander Prakash, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 677 days.

(21) Appl. No.: 12/640,242

(22) Filed: Dec. 17, 2009

(65) Prior Publication Data
US 2011/0150653 A1 Jun. 23, 2011

(51) Int. Cl.
*F01D 9/00* (2006.01)
(52) U.S. Cl.
USPC .......................... 415/210.1; 415/10; 415/914
(58) Field of Classification Search .................. 415/10, 415/210.1, 914; 416/193 A
See application file for complete search history.

(56) References Cited

U.S. PATENT DOCUMENTS

| | | | | |
|---|---|---|---|---|
| 6,431,829 | B1 * | 8/2002 | Watanabe et al. | 415/189 |
| 7,134,842 | B2 | 11/2006 | Tam et al. | |
| 7,380,756 | B1 | 6/2008 | Enloe et al. | |
| 7,695,241 | B2 * | 4/2010 | Lee et al. | 415/1 |
| 8,196,871 | B2 * | 6/2012 | Murray et al. | 244/204 |
| 2008/0089775 | A1 | 4/2008 | Lee et al. | |
| 2008/0145210 | A1 | 6/2008 | Lee et al. | |
| 2009/0243585 | A1 * | 10/2009 | Andarawis et al. | 324/71.2 |

OTHER PUBLICATIONS

Visbal et al., Control of Transitional and Turbulent Flows Using Plasma-Based Actuators, Jun. 2006, AIAA, pp. 1-22.*
Goksel et al., Active flow Control in Turbomachinery Using Phased Plasma Actuators, 2005, Institute of Bionics and Evolutiontechnique.*
J. Reece Roth, et al.; The Physics and Phenomenology of Paraelectric One Atmosphere Uniform Glow Discharge Plasma (OAUGDP™) Actuators for Aerodynamic Flow Control; AIAA Paper 2005-0781 presented at the AIAA 43rd Aerospace Sciences Meeting and Exhibit in Reno, NV; Jan. 10-13, 2005; 37 pages.

* cited by examiner

*Primary Examiner* — Edward Look
*Assistant Examiner* — Liam McDowell

(57) ABSTRACT

Plasma generators (48, 49, 70, 71) in an endwall (25) of an airfoil (22) induce aerodynamic flows in directions (50) that modify streamlines (47) of the endwall boundary layer toward a streamline geometry (46) of a midspan region of the airfoil. This reduces vortices (42) generated by the momentum deficit of the boundary layer, increasing aerodynamic efficiency. The plasma generators may be arrayed around the leading edge as well as between two airfoils (22) in a gas turbine nozzle structure, and may be positioned at correction points (68) in streamlines caused by surface contouring (66) of the endwall. The plasma generators may be oriented to generate flow vectors (74) that combine with boundary layer flow vectors (72) to produce resultant flow vectors (76) in directions that reduce turbulence.

20 Claims, 8 Drawing Sheets

MID-SPAN

ENDWALL
BOUNDARY
LAYER

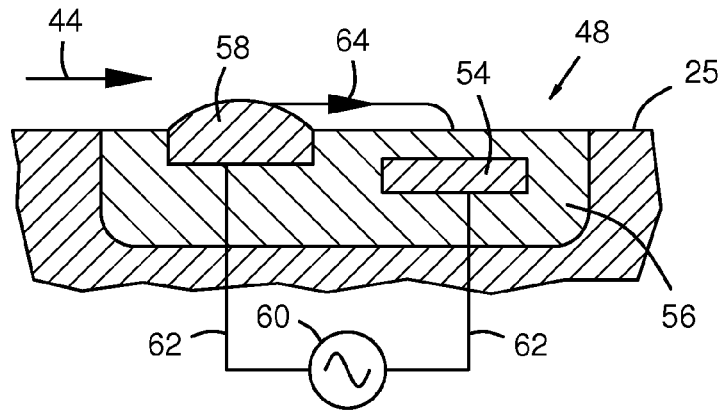
FIG 7
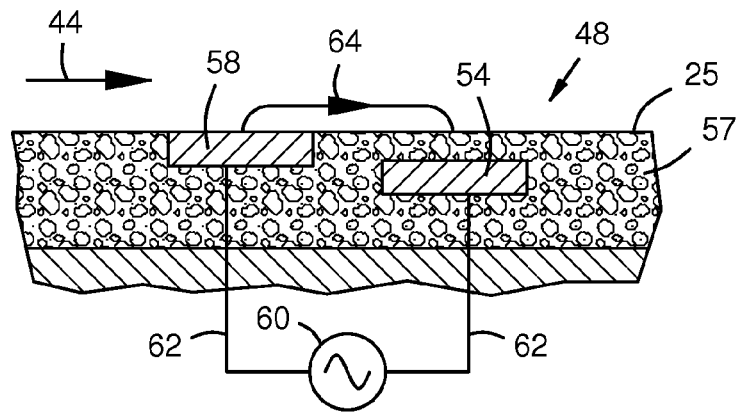
FIG 8
FIG 9
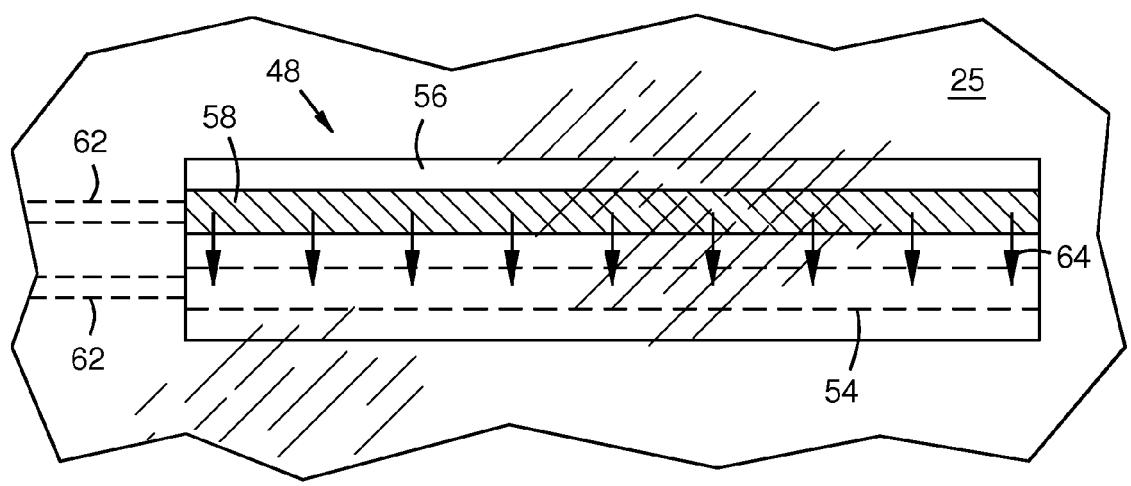

PLASMA INDUCED FLOW CONTROL OF BOUNDARY LAYER AT AIRFOIL ENDWALL

FIELD OF THE INVENTION

The invention relates to aerodynamics control for airfoils with transverse endwalls, such as gas turbine vanes, by inducing airflows in an endwall boundary layer using plasma generators to accelerate parts of the boundary layer in desired directions.

BACKGROUND OF THE INVENTION

Gas turbine engines have airfoils in the compressor and turbine sections, including stationary vanes and rotating blades. Each airfoil is mounted to a platform at one or both ends of the airfoil. Each platform has an endwall that is transverse to the airfoil at its intersection with the airfoil. A gas flow over the airfoil and endwall includes a slow-moving boundary layer adjacent to the gas path surfaces. This creates shear in the flow relative to faster moving gas away from the surfaces. A horseshoe vortex having two legs is generated around the leading edge of the airfoil at the endwall. One leg of the horseshoe vortex extends from the pressure side and across the passage on the endwall surface toward the suction side of the adjacent airfoil, and another leg extends along the suction side of the airfoil. These vortices migrate, expand, and interact with adjacent vortices, creating drag and increasing cooling requirements.

Attempts have been made to eliminate or reduce these vortices. Dielectric barrier plasma generators are known to induce flow in a neutral gas via momentum transfer from an ionized gas moving from an exposed electrode to an insulated electrode. US patent publication 2008/0145210 describes plasma generators mounted in a fillet between the leading edge and the endwall. They produce plasma extending over a portion of the fillet in the leading edge region to reduce the initiation of horseshoe vortices. Other methods to reduce the vortices include contouring the endwall as described in US patent publication 2007/0258810 and U.S. Pat. No. 7,134,842. The present inventors recognized that improvement on these prior technologies is possible.

BRIEF DESCRIPTION OF THE DRAWINGS

The invention is explained in the following description in view of the drawings that show:

FIG. 7 is a sectional view of a dielectric barrier plasma generator mounted in a groove in an endwall.

FIG. 8 is a sectional view of a dielectric barrier plasma generator formed in place by layering in a thermal barrier coating (TBC), using the TBC as the dielectric.

FIG. 9 is a plan view of an elongated plasma generator mounted in an endwall.

DETAILED DESCRIPTION OF THE INVENTION

Figure 1:
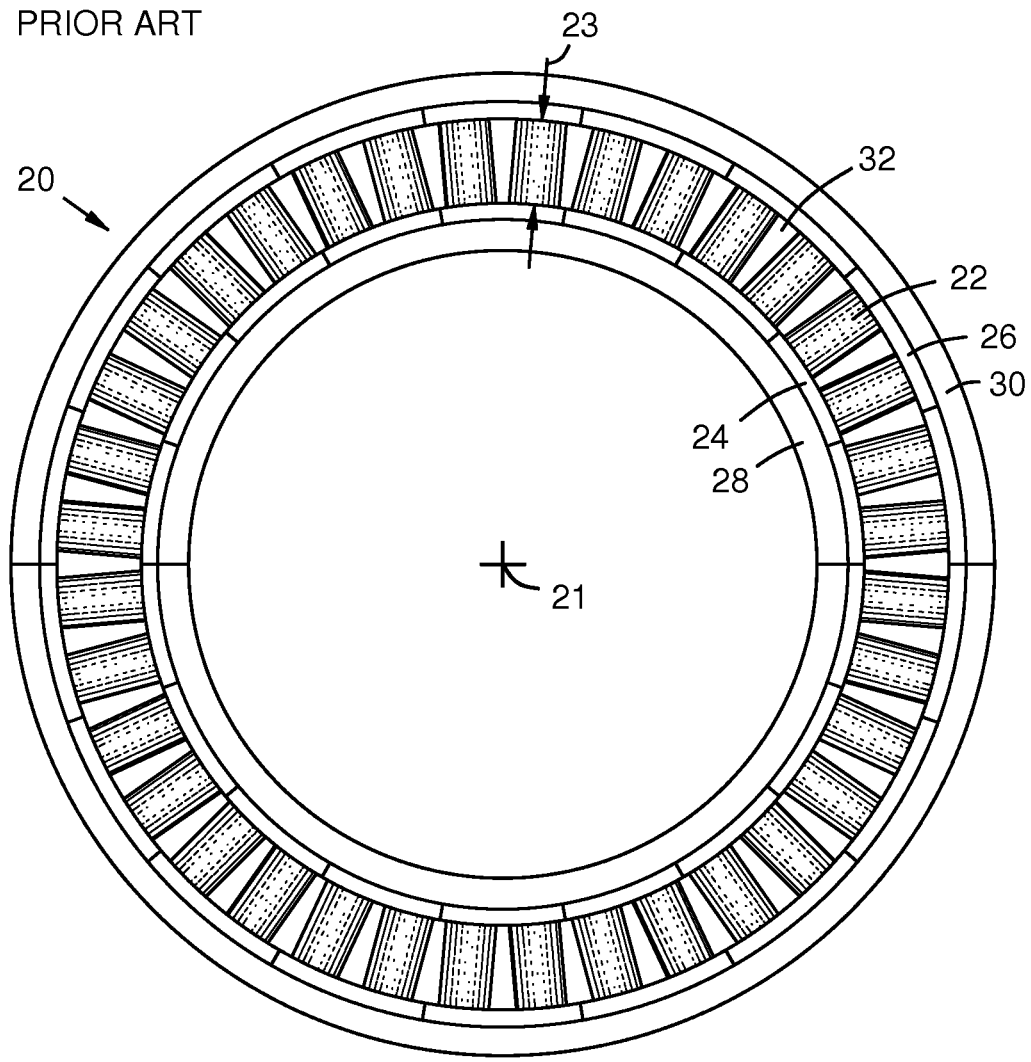
FIG. 1 shows a circular array of vanes in a turbine or compressor.

FIG. 1 illustrates a ring 20 of stationary vanes 22 centered on an axis 21 in a turbine or compressor. Each vane is an airfoil that spans radially 23 between inner and outer platforms 24, 26. Herein "radially" means with respect to the axis 21. The platforms may be attached to respective inner and outer ring structures 28, 30, which may be support rings and/or cooling plenums. Between each pair of vanes 22 is a gas flow passage 32. In a gas turbine, the vanes 22 direct a combustion gas flow against an adjacent downstream ring of rotating blades not shown. In the case of a compressor, the vanes 22 direct a gas such as inlet air against an adjacent downstream ring of rotating blades not shown. It is common to assemble or fabricate two or more vanes 22 per pair of platforms 24, 26 to form what is called a nozzle.

Figure 2:
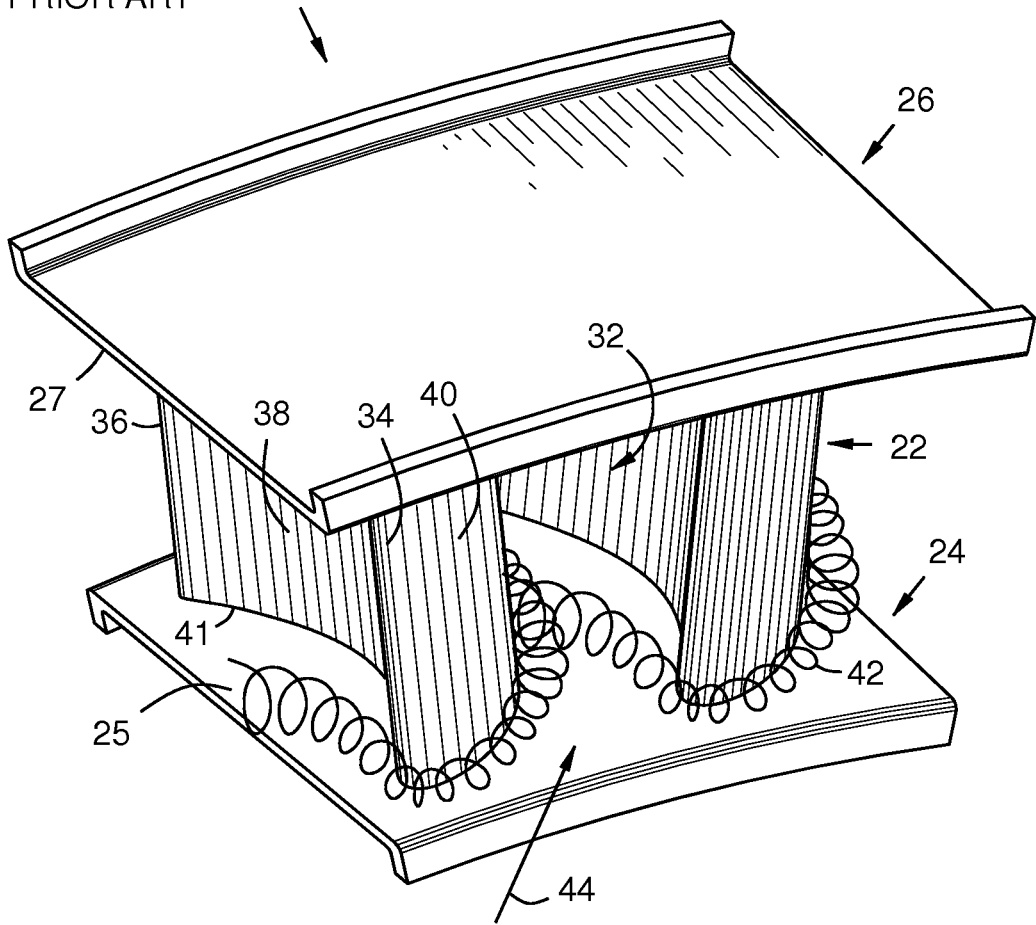
FIG. 2 shows two vanes spanning between inner and outer platforms. This type of assembly is called a "nozzle" herein. A horseshoe vortex having two legs is shown.

FIG. 2 shows a gas turbine or compressor nozzle 19 with a pair of vanes 22 spanning between an inner platform 24 and an outer platform 26. The vanes may be attached to the platforms by means of welding, pins, or other fastening mechanisms, or the vanes and platforms may be cast integrally, or the platform may be cast onto the previously cast airfoil(s). Such details are well known in the art. Each vane 22 has a leading edge 34, a trailing edge 36, a pressure surface 38 between the leading and trailing edges, a suction surface 40 between the leading and trailing edges opposite the pressure surface. A curve 41 is defined by an intersection between the airfoil and each endwall 25, 27 of the platforms. A fillet 43 may be formed along this intersection as later shown.

A gas flow 44 enters the gas flow path 32 from an initial direction. The gas flow separates around the leading edges 34 of the vanes and defines streamlines between the vanes. A horseshoe vortex 42 having two legs forms around the leading edge of each vane at the endwall 25, due to the endwall boundary layer interacting with the leading edge 34. One leg of the vortex travels from the pressure side leading edge and across the passage endwall toward the suction side of the adjacent airfoil to form a passage vortex, and the other leg travels along the suction side 40 of the respective airfoil. These vortices dissipate energy, cause aerodynamic losses, and increase heat loads on the airfoil and endwall. These vortices migrate from the lower span to the higher span and merge at the trailing edge, causing significant aerodynamic losses and turbine efficiency.

Figure 3:
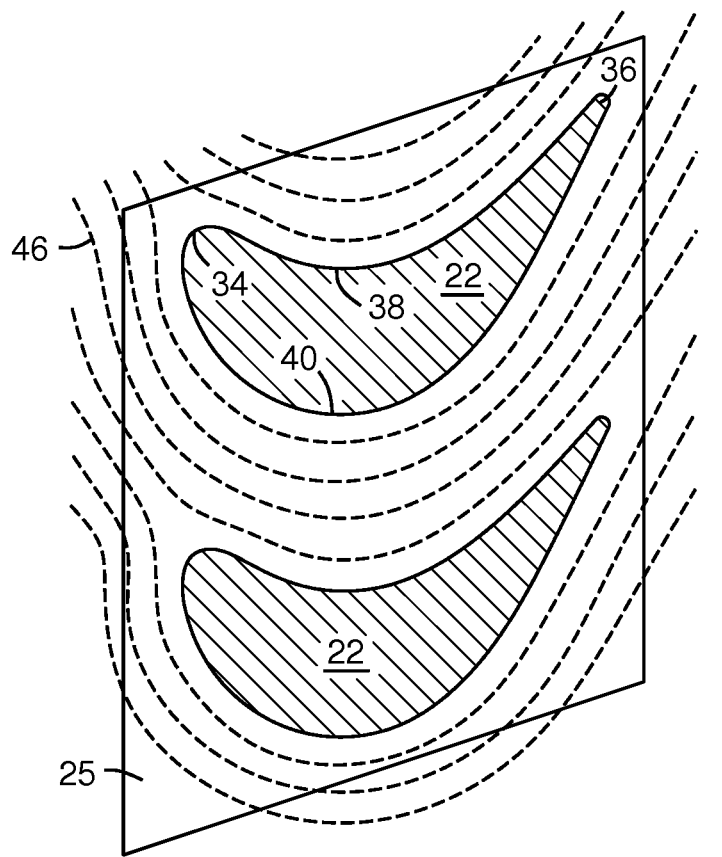
FIG. 3 shows a 2D geometry of aerodynamic streamlines taken in a plane transverse to the airfoils at a mid-span region of the airfoils.

FIG. 3 shows a 2D streamline geometry 46 of a gas flow through a pair of vanes 22 taken on a plane transverse to the span at a mid-span region of the vanes. This is a desirable flow pattern that generally parallels the pressure and suction surfaces 38, 40 in the given plane.

Figure 4:
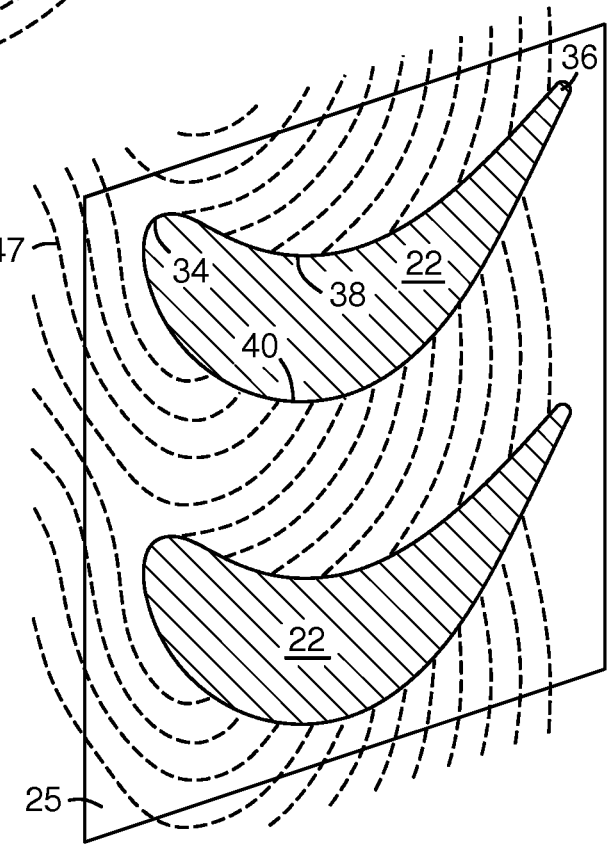
FIG. 4 shows a 2D geometry of aerodynamic streamlines taken in the boundary layer of an endwall.

FIG. 4 shows streamlines 47 of a gas flow through a pair of vanes 22 taken in or near the boundary layer of the endwall 25. This shows the effects of the vortices which cause the streamlines 47 to deviate from being parallel to the streamlines 46 existing at the mid-span location. The lines 47 appear to end at the airfoil surface because the flow climbs or descends from the airfoil surface due to the vortices. Airfoil effectiveness is reduced in this plane.

Figure 5:
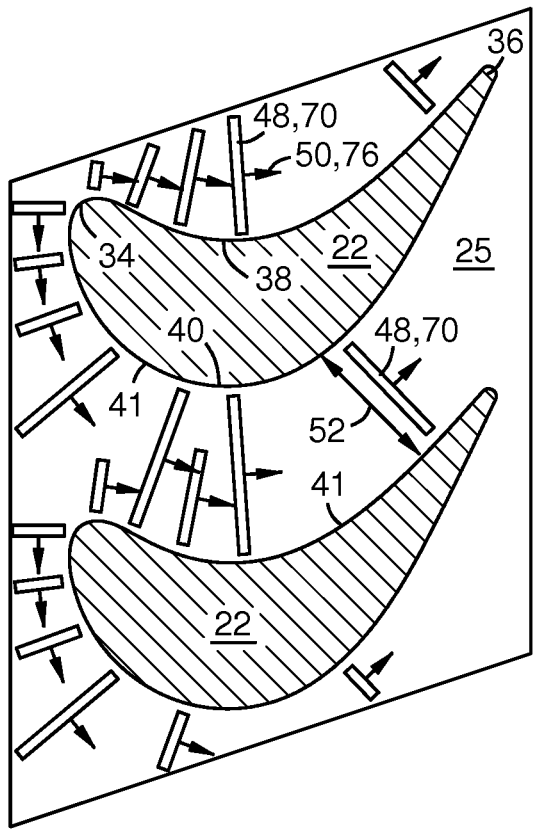
FIG. 5 shows an endwall with a pattern of directional plasma generators.
Figure 6:
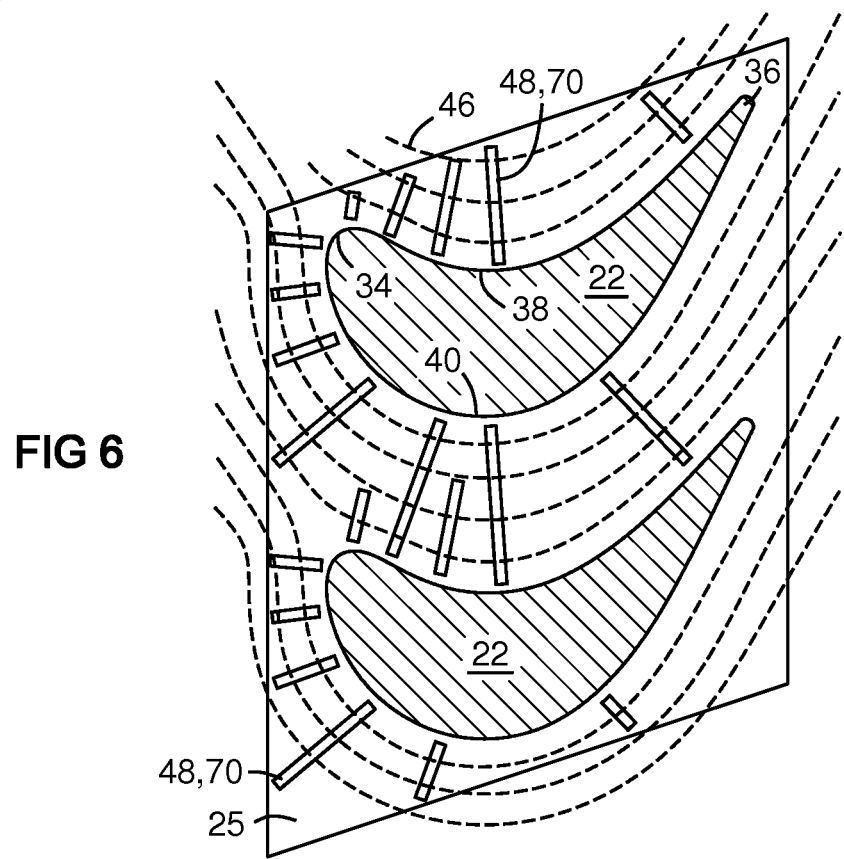
FIG. 6 shows an induced geometry of streamlines in the boundary layer of an endwall induced by plasma generators.

FIG. 5 shows an endwall 25 with plasma generators positioned to guide an aerodynamic boundary layer flow over the endwall and to redirect the streamlines of FIG. 4 to be more like the geometry of FIG. 3. Each generator 48 may be elongated as shown and/or plural generators may be aligned in rows or placed in arrays covering areas of the endwall. For example at least some of the generators 48 may extend substantially perpendicularly to the intersection curve 41 between the airfoil 22 and the endwall 25. Each generator induces a gas flow 50 in a given direction in the boundary layer. Plasma generator placements in this drawing exemplify placements and orientations that accelerate portions of the boundary layer flow 47 in directions that reduce turbulence. For example they may urge and redirect boundary layer flow lines 47 toward the geometry of streamlines 46 of a mid-span transverse plane of flow lines, such as shown in FIG. 3, in which the boundary layer streamlines are redirected to flow substantially parallel to the intersection curve 41 as shown in FIG. 6. It is recognized that the streamlines of FIG. 6 are idealized for illustration purposes, and while actual embodiments may not result in streamlines 47 that are exactly parallel to the mid-span streamlines 46, the plasma generator(s) 48 would in any case urge the streamlines proximate the endwall to be somewhat more parallel to the streamlines at the mid-span than they otherwise would be without the influence of the generators. The plasma generators are oriented to generate flow vectors that combine with boundary layer flow vectors to produce resultant flow vectors in directions that reduce turbulence and urge the passage vortex away from the suction surface of the adjacent airfoil. The plasma generators may be placed on either or both of the inner and outer endwalls of a turbine vane or on any endwall of an airfoil in general.

FIG. 6 shows the desired result of the boundary layer accelerations. Horseshoe vortex generation is suppressed at an early stage by plasma generators around or upstream of the leading edges 34, or more generally in an upstream half of the air passage between the adjacent airfoils 22. Further boundary layer guidance may be provided at a more downstream location by plasma generators 48 disposed between the vanes, optionally including in the minimum throat area 52 between the vanes or other location(s) in the downstream half of the air passage between the adjacent airfoils 22. The combined effect influences the boundary layer of the fluid flow proximate the endwall in a manner that minimizes the horseshoe vortex in the fluid flow and redirects the passage vortex away from the suction surface of the adjacent airfoil.

FIG. 7 and FIG. 8 show single dielectric barrier aerodynamic plasma generators 48. A first electrode 54 is insulated by a dielectric material 56. A second electrode 58 is non-insulated. A power source 60 provides a voltage difference between the electrodes via conductors 62. A gas flow 44 is directionally accelerated via momentum coupling with the plasma 64. This type of plasma-induced airflow generator is known, for example as described in US patent publication 2009/0196765, and U.S. Pat. No. 7,380,756, incorporated by reference herein, and are thus not further detailed here except as to enhancements.

The exposed electrode 58 may be flush or nearly flush with the surface of the endwall 25 to reduce wear on the electrode from abrasive gas flow. As shown in FIG. 8 the plasma generators may be formed in place on the endwall 25 in a layering process that applies a protective coating 57. The coating may also serve as the dielectric. The coating may be a thermal barrier coating made of a thermally and electrically insulating ceramic material such as $Al_2O_3$ and/or other known coatings used in high-temperature areas of a gas turbine. The electrodes 54, 58 and conductors 62 may be made of a refractory material such as carbon fiber, graphite, tungsten, tungsten carbide, or others, especially ceramics.

FIG. 9 shows a plan view of a plasma generator 48 on an endwall 25. The conductors 62 may pass through the endwall and/or may be deposited in a layer of the endwall or within a coating thereon. Turbine airfoils are often hollow for cooling. The conductors may pass through vane cooling channels from the inner platform 24 to the outer platform 26, and then to the power source 60.

Figure 10:
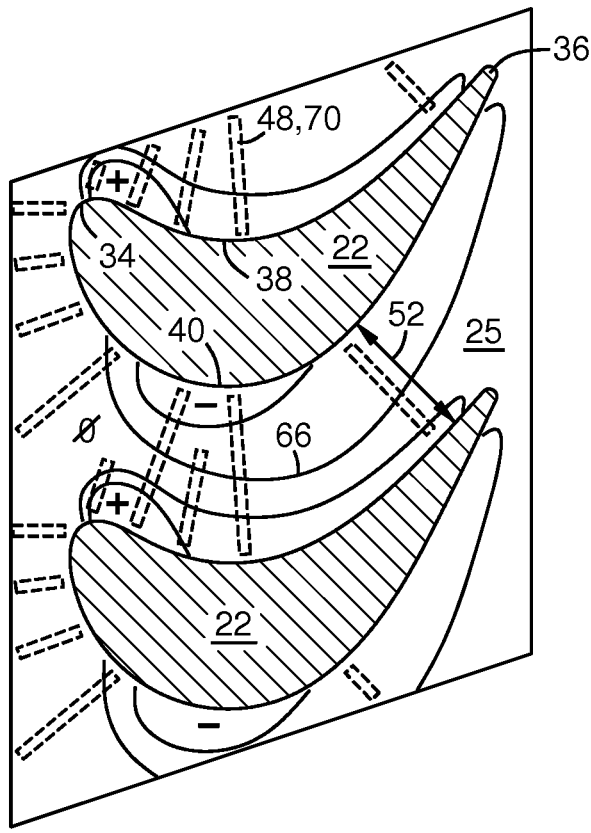
FIG. 10 shows non-axisymmetric endwall contouring.
Figure 11:
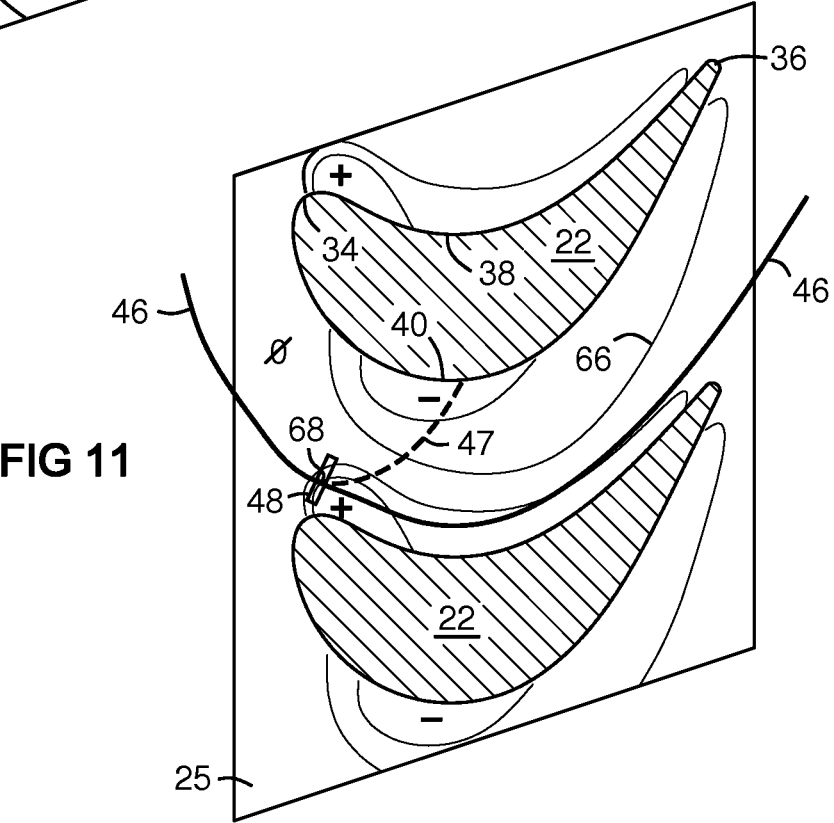
FIG. 11 shows a plasma generator located at a streamline correction point caused by endwall contouring.

FIG. 10 shows an endwall with surface contouring indicated by contour lines 66 designed to reduce the horseshoe vortices. A peak is indicated by "+", a valley is indicated by "−", and a neutral elevation is indicated by "0". Such contouring is called non-axisymmetric. Details and effects of such contouring are known in the art, so they are not described here. They are described for example in US patent publication 20070258810 and in U.S. Pat. No. 7,134,842. The present invention may be combined with such contouring as shown. This may provide a synergy that makes both the contouring and the plasma generators more effective than either one alone, and more effective than the simple sum of their effects. The contouring 66 deflects the normal prior art boundary layer streamlines 47 toward the path of the mid-span streamlines 46, with the point of departure (improvement) from the streamline 47 being referred to herein as an correction point 68. Correction points 68 in the streamlines created by endwall surface contouring provide a leveraged effect on downstream flow, and thus are locations for placement of plasma generators 48 as shown in FIG. 11. The plasma generators may follow the curved surface of the endwall and/or may be placed on the neutral portions "0" of the surface before and beside the peaks and valleys. A plasma generator may be formed in place to follow the curvature of the surface by layering in the coating as in FIG. 8.

Figure 12:
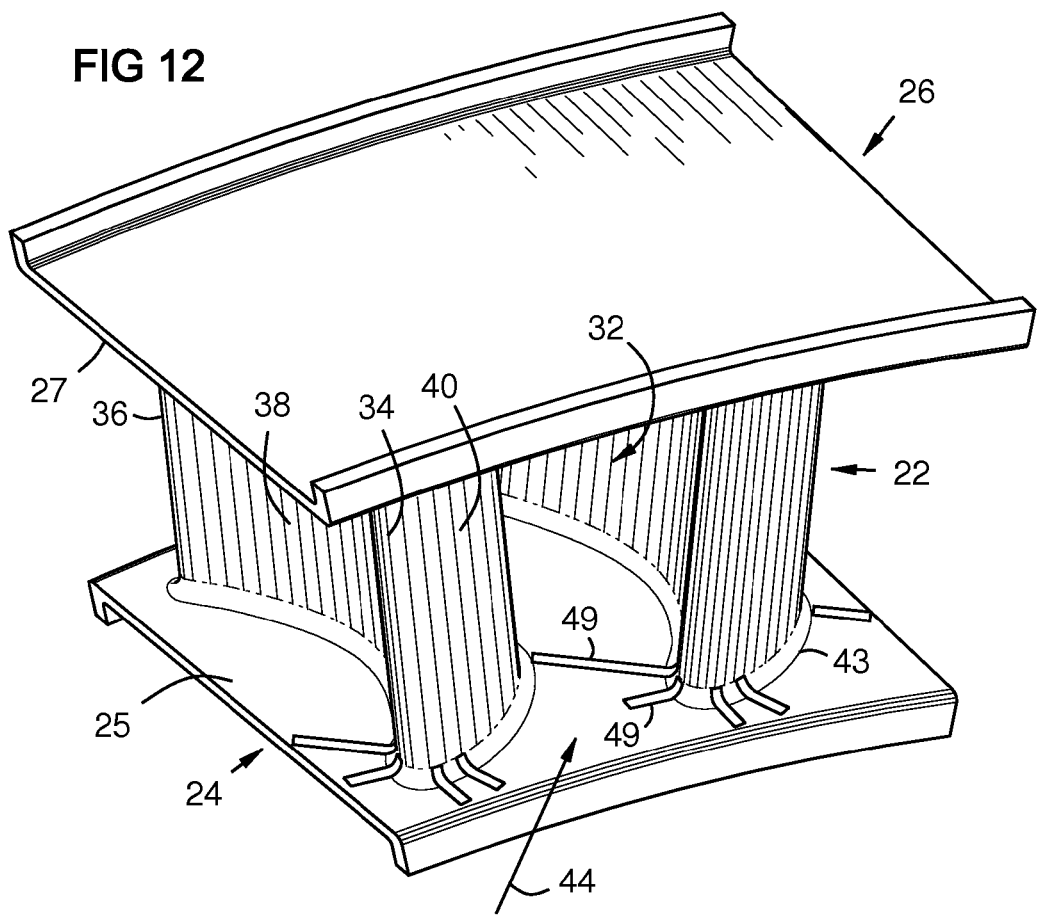
FIG. 12 is a perspective view of a nozzle with plasma generators spanning a fillet at the leading edge of each airfoil.

FIG. 12 shows a nozzle with plasma generators 49 spanning an airfoil/endwall fillet 43 and extending substantially perpendicularly to the fillet along the endwall 25 to accelerate streamlines substantially parallel to the fillet 43. This geometry is beneficial around a leading edge portion of the airfoil in order to intercept the initiation area of the horseshoe vortices where the endwall boundary layer curls over the fillet. This is something like a bow wave on a ship. However, the plasma generators may be oriented differently than as shown. For example they may be oriented to generate a flow vector that combines with a vortex flow vector to produce a resultant vector in the desired direction. This includes a generated flow vector that may in some cases partly or completely oppose the unmodified boundary layer flow vector.

Figure 13:
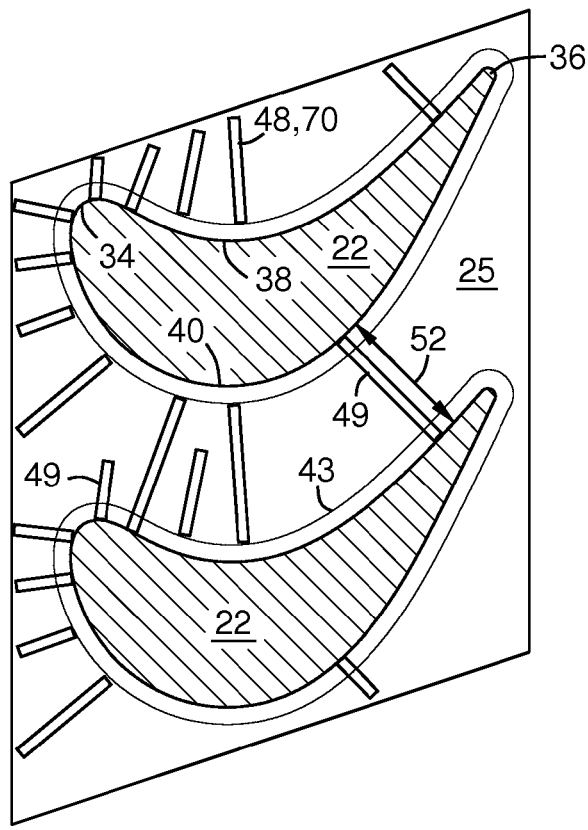
FIG. 13 shows a pattern of plasma generators on an endwall.

FIG. 13 shows a pattern of plasma generators on an endwall in which some generators 49 span the fillet 43, and other generators 48 do not.

Figure 14:
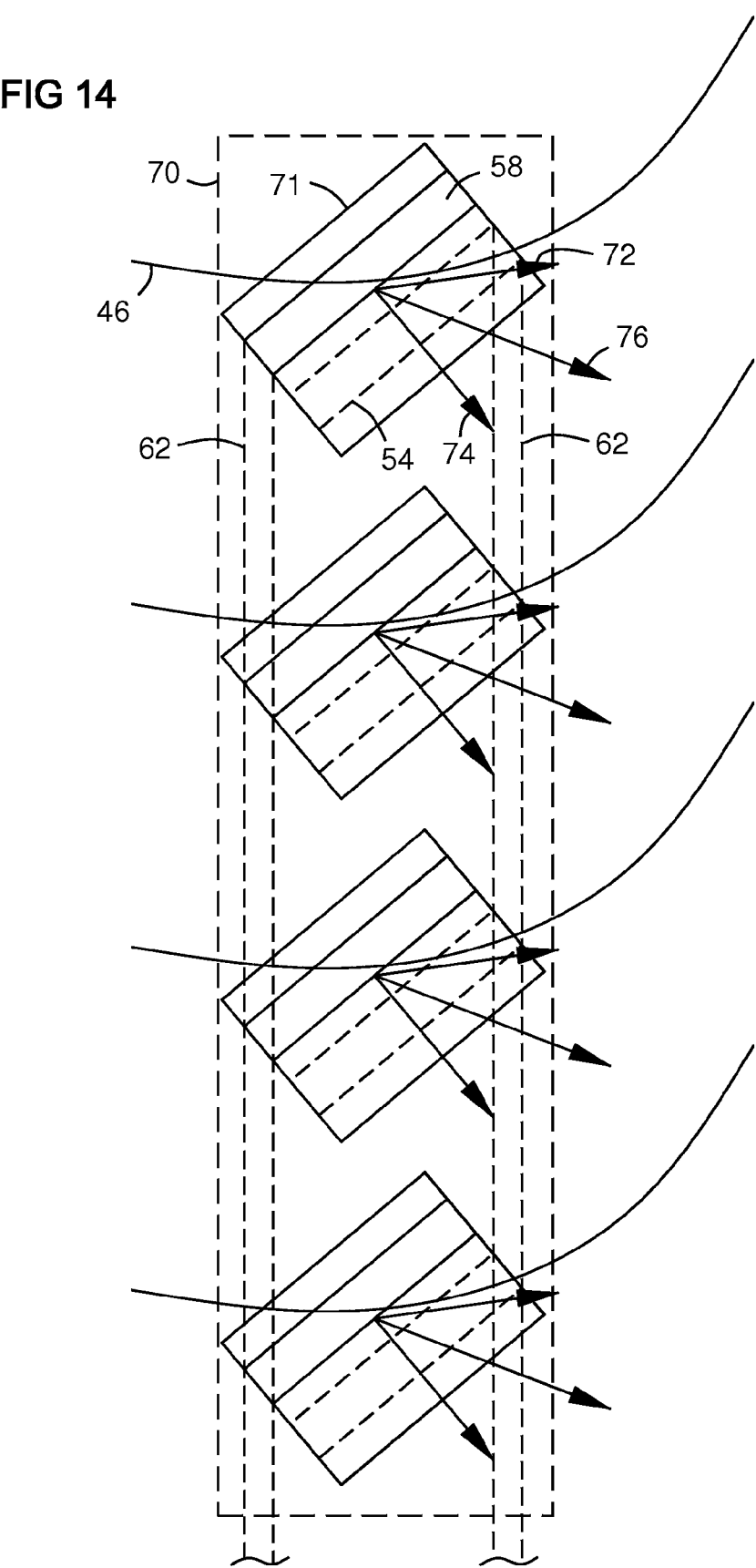
FIG. 14 shows a plasma generator formed of multiple elements, and shows flow vectors of the boundary layer, the generator, and resultant flow vectors.

FIG. 14 shows a compound plasma generator 70 defined by a row of smaller plasma generators 71, each smaller generator having an exposed electrode 58 and an insulated electrode 54. The electrodes are served by electrical conductors 62. The smaller plasma generators are oriented to generate flow or momentum vectors 74 that combine with boundary layer flow or momentum vectors 72 to produce resultant flow or momentum vectors 76 in directions that reduce turbulence for example as shown in FIG. 11. A single elongated plasma generator element 48 as in FIG. 9 can also be so oriented. The dashed line 70 indicates a definition boundary of the compound plasma generator 70. This may or may not be a physical delineation. In other words, a row of smaller plasma generators 71 may be considered as a single compound plasma generator 70, whether or they are physically packaged as a unit.

Turbine vanes and compressor vanes with inner and outer platforms are discussed herein as exemplary applications. However, the present technology may be applied to any airfoil/endwall interface—for example with rotatable turbine blades, aircraft wings, horizontal and vertical stabilizers, and wing-tip winglets.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus comprising:
    an airfoil comprising a leading edge, a trailing edge, a pressure surface between the leading and trailing edges, a suction surface between the leading and trailing edges opposite the pressure surface, and a span of the airfoil between opposed ends of the airfoil;
    an endwall at one end of the airfoil and generally transverse to the span of the airfoil; and
    a plasma generator disposed on the endwall and effective to accelerate a boundary layer flow over the endwall toward a direction of a streamline pattern existing proximate a mid-span of the airfoil.

2. The apparatus of claim 1 wherein the plasma generator is elongated in a direction that radiates from an intersection between the airfoil and the endwall, and the plasma generator urges the flow substantially parallel to the intersection.

3. The apparatus of claim 1 wherein the endwall comprises a curved surface with variations in height in a direction of the span, including a relative peak proximate a pressure side of the leading edge of the airfoil and a relative valley proximate a suction side of an adjacent airfoil, wherein the curved surface deflects a boundary layer streamline toward a direction of a corresponding mid-span streamline, and wherein the plasma generator conforms in shape to the curved surface.

4. The apparatus of claim 3 wherein the plasma generator is located proximate a correction point where the boundary layer streamline is first diverted by the curved surface toward the direction of the corresponding mid-span streamline.

5. The apparatus of claim 1 wherein the plasma generator comprises two electrodes separated by a dielectric material, and the plasma generator is formed by layering in a thermal barrier coating on the endwall, with the thermal barrier coating being the dielectric material.

6. The apparatus of claim 1, further comprising the plasma generator being disposed proximate a throat region defined between the airfoil and an adjacent airfoil.

7. The apparatus of claim 1, further comprising a plurality of plasma generators disposed on the endwall and effective to influence the aerodynamic boundary layer flow over the endwall at a respective plurality of locations along its passage from the leading edge to the trailing edge.

8. The apparatus of claim 1, wherein the plasma generator is angled to produce a flow acceleration vector that produces a resultant boundary layer flow vector at an angle between a boundary layer flow vector and the acceleration vector, wherein the resultant flow vector is in the direction of the mid-span streamline pattern.

9. The apparatus of claim 1, wherein the plasma generator comprises a row of smaller plasma generators, wherein each of the smaller plasma generators is angled to accelerate a boundary layer flow to produce a resultant boundary layer flow in a direction and increased speed that reduces turbulence.

10. An apparatus comprising:
    first and second airfoils spanning between two endwalls;
    each airfoil comprising a leading edge, a trailing edge, a pressure surface between the leading and trailing edges, a suction surface between the leading and trailing edges opposite the pressure surface, and a span of the airfoil between the endwalls; and
    a plurality of plasma generators on at least one of the endwalls that accelerate an aerodynamic boundary layer of said one endwall toward being parallel to a 2D aerodynamic streamline geometry defined in a plane transverse to the airfoils at a midspan region of the airfoils.

11. The apparatus of claim 10 wherein said at least one endwall comprises a curved surface with variations in height in a direction of the span, including a relative peak proximate a pressure side of the first airfoil and a relative valley proximate a suction side of the second airfoil, wherein the curved surface deflects a boundary layer streamline toward a direction of the 2D streamline geometry, and wherein at least some of the plasma generators conform in shape to the curved surface.

12. The apparatus of claim 11 wherein at least one of the plasma generators is located at a correction point caused by the curved surface of the endwall where the boundary layer streamline is first diverted toward direction of the 2D streamline geometry by the curved surface.

13. The apparatus of claim 10 wherein each plasma generator comprises two electrodes separated by a dielectric material, and at least some of the plasma generators are formed by layering in a thermal barrier coating on said at least one endwall and use the thermal barrier coating as the dielectric material.

14. The apparatus of claim 10 wherein the two airfoils and the two endwalls form a turbine nozzle.

15. The apparatus of claim 10 wherein at least one of the plasma generators is mounted across a minimum throat area of a gas flow path between the two airfoils.

16. An apparatus comprising:
    a pair of airfoils and an endwall there between defining an air passage for the flow of a fluid, the air passage comprising an upstream half and a downstream half;
    a boundary layer of the fluid flow proximate the endwall creating a horseshoe vortex in the fluid flow migrating from proximate a pressure side of a first of the airfoils in the upstream half to a suction side of a second of the airfoils in the downstream half;
    structure disposed in the endwall in both the upstream half and the downstream half of the air passage, the structure comprising
    a) contouring on the endwall between the airfoils, and
    b) a plasma generator in the endwall in the air passage;
    wherein the structure redirects the horseshoe vortex away from a trailing edge of the second of the airfoils.

17. The apparatus of claim 16, wherein the structure comprises a curved surface of the endwall in the upstream half and a plasma generator disposed in the endwall in the downstream half.

18. The apparatus of claim 17, wherein the plasma generator is disposed at a throat region defined between the airfoils.

19. The apparatus of claim 16, wherein the plasma generator is disposed proximate a leading edge of the first airfoil at a streamline correction point where the contouring first redirects a streamline in a boundary layer flow to redirect the horseshoe vortex.

20. The apparatus of claim 19, wherein a peak of the contouring is proximate the leading edge of the first airfoil, and further comprising a second plasma generator that spans from the pressure side of the first airfoil to a suction side of the second airfoil across a throat region defined at a minimum separation between the airfoils.

\* \* \* \* \*